United States Patent

Pittner

[11] 3,749,989
[45] July 31, 1973

[54] TENSION CONTROL INCLUDING MOTOR SPEED REGULATION SYSTEM
[75] Inventor: John R. Pittner, Pittsburgh, Pa.
[73] Assignee: Westinghouse Electric Corporation, Pittsburgh, Pa.
[22] Filed: Feb. 4, 1972
[21] Appl. No.: 223,564

[52] U.S. Cl. .................................. 318/6, 242/75.44
[51] Int. Cl. ............................................. B59h 59/38
[58] Field of Search ............... 318/6, 7; 242/75.44

[56] References Cited
UNITED STATES PATENTS
2,021,757  11/1935  Umansky ........................... 318/7 X
3,223,906  12/1965  Dinger .................................. 318/7

Primary Examiner—T. E. Lynch
Attorney—F. H. Henson, J. J. Wood et al.

[57] ABSTRACT

This disclosure relates to a speed regulation system for a line speed pace motor for actuating strip material that is being wound or unwound in coil form by a reel motor. Diameter signals are generated which are a function of the instantaneous coil diameter D. Using field weakening for speed control of the reel motor, the coil has a defined diameter Do when the reel motor is at weakest field. Circuitry is arranged to receive the diameter signals and deliver control signals as a function of the instantaneous diameter for all diameters $D \leq Do$. A speed regulation circuit for the line speed pace motor is connected to receive dual inputs, one being a speed command or reference signal, and the other being the control signals. The speed regulation circuit then delivers a constant speed signal to the line speed pace motor when $D > Do$, and a progressively decreasing speed signal to the line speed pace motor for all magnitude of $D \leq Do$, so that at weakest field of the reel motor, the line speed is reduced progressively as a function of the instantaneous diameter.

4 Claims, 3 Drawing Figures

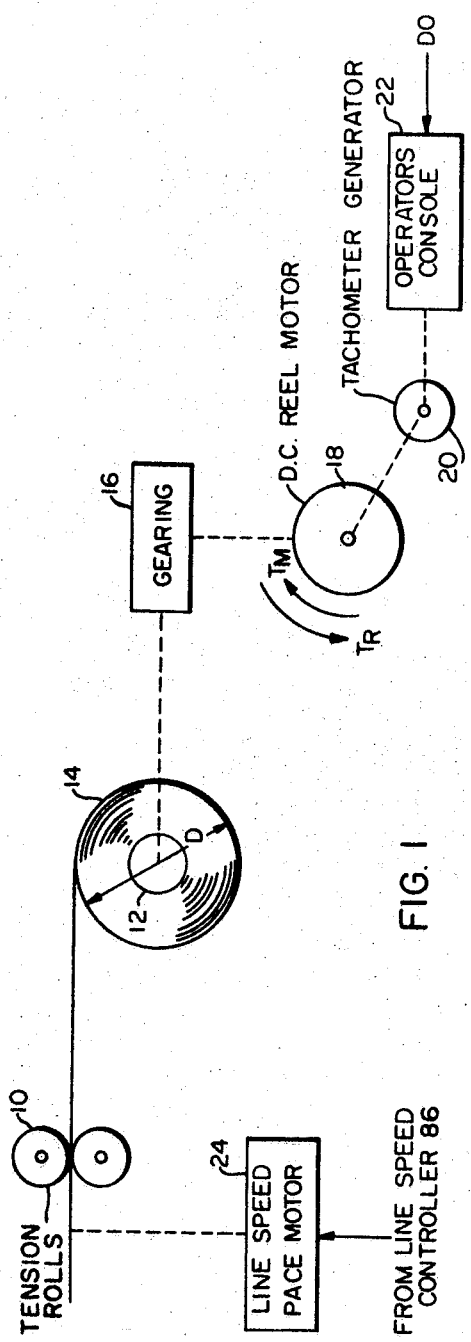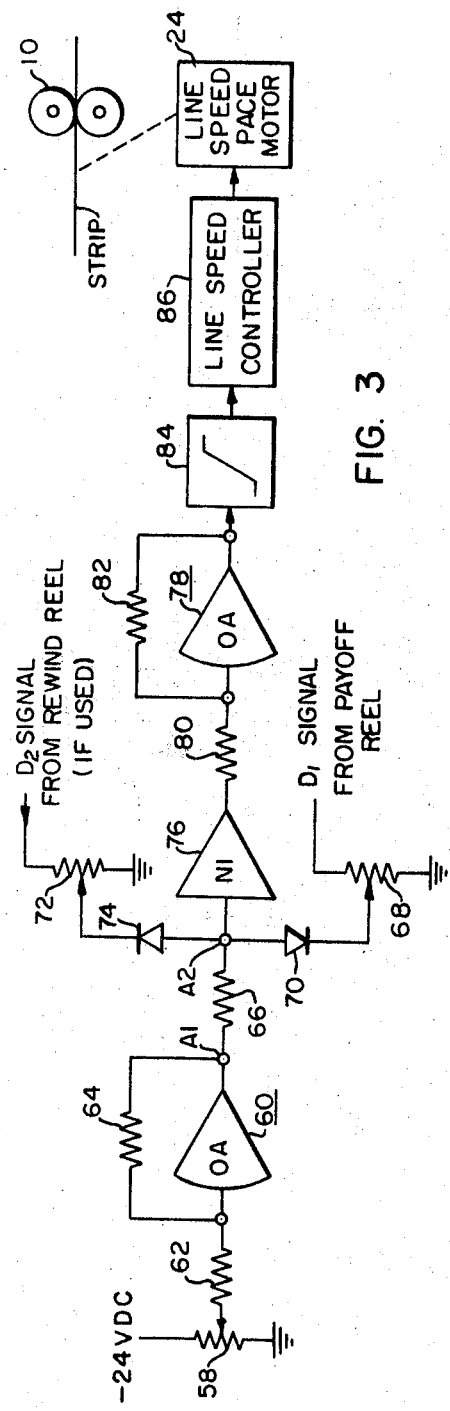
FIG. 1
FIG. 3

TENSION CONTROL INCLUDING MOTOR SPEED REGULATION SYSTEM

CROSS REFERENCE TO RELATED APPLICATION

See copending application entitled "Constant Tension Control System for a DC Reel Drive Motor" Ser. No. 214,808, filed on Jan. 3, 1972, in the name of John R. Pittner, and assigned to the same assignee as the present invention.

BACKGROUND OF THE INVENTION

1. Field of the Invention

The invention relates to a constant tension control system for direct current reel drive motors operating to wind or unwind a coil of strip material moving along a process line.

2. Description of the Prior Art

The prior art has provided a variety of techniques for controlling direct current reel drive motors so as to insure constant tension in a coil of strip material that is being wound or unwound. The speed of DC shunt motors is frequently controlled by field weaking, the motor attaining its highest speed at the weakest field setting. Usually, then the latter field setting is the controlling parameter, and motor operation is not permitted at higher speeds. While it is true that for some motors, the manufacturer's specifications do permit higher speeds and overvoltage conditions, these increased operational ranges for speed and voltage are for limited periods of time, and are more or less intended for emergency situations, and not recommended for routine operations.

The DC reel motor acts as a drag machine so that it tends to follow the line speed and produce all the drag necessary. When the reel motor is at weakest field, if the process line speed is high enough, the DC reel motor will run at both higher speed and voltage. The present invention provides a system for automatically enabling the line speed to be reduced, if necessary, when the highest rated motor speed is attained.

SUMMARY OF THE INVENTION

A speed regulation system for a line speed pace motor is provided for actuating strip material being wound or unwound in coil form by a reel motor. Means provide succesive diameter signals which are functions of the instantaneous coil diameter D, the coil having a finite diameter Do when the reel motor is at the weakest field flux. Means are coupled to the diameter signal means to receive the diameter signals and deliver control signals as a function of the instantaneous diameter when $D \leq Do$. Means for regulating the speed of the line speed pace motor are connected to receive dual inputs, the one being a command or reference speed input signal, the other being said control signals, the speed regulating means delivering a constant speed signal to said line speed pace motor when $D > Do$ and progressively decreasing speed signals to said line speed pace motor for all magnitudes of $D \leq Do$.

BRIEF DESCRIPTION OF THE DRAWINGS

FIG. 1 is a schematic illustrating the speed regulation system of the invention in one environmental setting;

FIG. 3 is an electrical schematic of the speed regulatory system of the invention.

GENERAL CONSIDERATIONS

Figure 2:
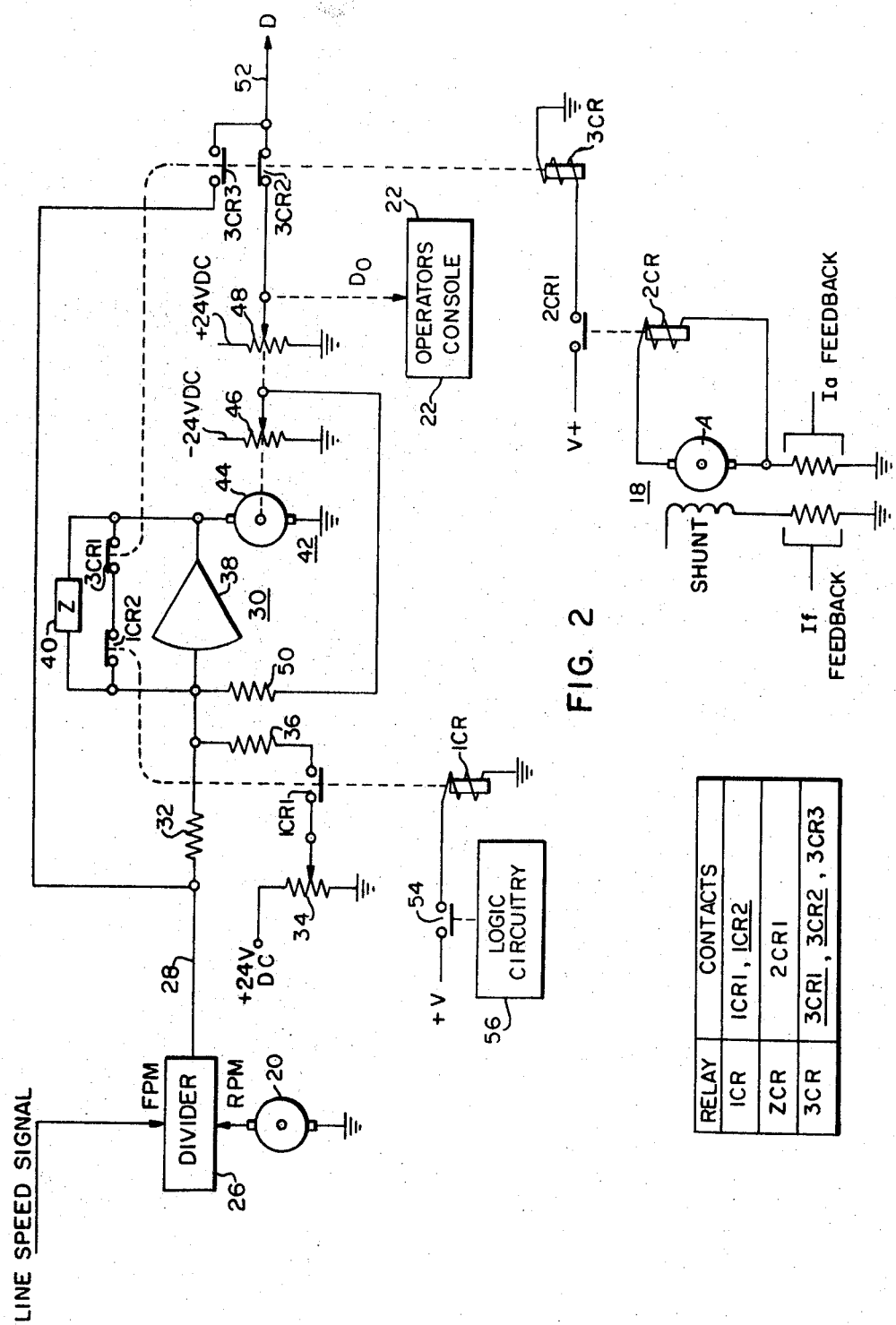
FIG. 2 is an electrical schematic showing the diameter memory and diameter signals circuitry utilized in the speed regulatory system of the invention.

Referring now to FIG. 1, a strip of material passing through tension rolls 10 is being wound on a mandrel 12 to form a coil 14. As noted in FIG. 1, the coil has a variable diameter D. The mandrel 12 is coupled, through gearing shown symbolically at 16, to a DC reel drive motor 18. A tachometer generator 20 is connected to the shaft of motor 18. The output signal of the tachometer generator is utilized at several points throughout the system, but here in FIG. 1 it is shown being coupled to the operator's console 22 to enable the reel drive motor speed to be monitored. A line speed pacer motor 24 sets the speed for the entire process line. Reel drive motor 18 essentially acts as a drag machine in responding to the strip line speed.

In order to understand the rationale upon which the invention rests, the following mathematical analysis is presented.

In one revolution, the calculated circumference of the reel:

$$(1) \quad C = \pi D$$

where $C$ = circumference
$D$ = diameter of the reel

Multiplying the circumference $C$ by the revolutions per minute gives the length of material wound or unwound per unit time.

$$(2) \quad FPM = \pi D \times (RPM/K_1)$$

where

FPM = the process line speed (feet per minute)
RPM = the speed of reel motor (revolutions per minute)
$K_1$ = the gearing constant The reel motor speed is first controlled by field weakening. At weakest field the process line speed is FPMo, the reel motor speed is RPMo, and the reel diameter is Do.

$$(3) \quad FPMo = (\pi Do \, RPMo/K_1)$$

If the line speed is made directly proportional to the diameter. Then for $D \leq Do$ $$(4) \quad FPM = K_2 D$$

where $K_2$ = a proportionality constant

Then substituting equation (4) in equation (2)

$$(5) \quad K_2 D = \pi D (RPM/K_1)$$

$$(6) \quad K_1 K_2 = \pi \, RPM$$

$$(7) \quad (K_1 K_2/\pi) = RPM = a \text{ constant} = RPMo$$

In order then to insure that the reel motor speed RPM = RPMo, solve equations (3) and (7) for $K_1$;

$$(8) \quad FPMo \, K_1 = \pi Do \, RPMo$$

$$(9) \quad K_1 = (\pi Do \, RPMo/FPMo)$$

$$(10) \quad K_1 K_2 = RPMo$$

$$K_1 = (\pi RPMo/K_2)$$

Equating equations (9) and (10)

$$(11) \quad (\pi Do \text{ RPM}o/\text{FPM}o) = (\pi \text{ RPM}o/K_2)$$

solving for $K_2$ $$(12) \quad K_2 = (\text{FPM}o/Do)$$

DESCRIPTION OF THE PREFERRED EMBODIMENT

Before beginning a description of the preferred embodiment some observations are in order. The instant invention system may be used wherever a DC reel shunt motor is operating at its highest speed and the process line speed is high enough so that without an adjustment it would cause the reel motor to exceed its rated speed at weakest field; the invention provides automatic compensation of the line speed as a function of the reel diameter.

The invention may also be used advantageously with the teachings of the copending application for "Constant Tension Control System for a DC Reel Drive Motor" Ser. No. 214,808 filed on Jan. 3, 1972 in the name of John R. Pittner and assigned to the same assignee as the instant invention.

Briefly, the latter invention in order to achieve constant strip tension, provides for flux control between full field and weak field. At the coil diameter $Do$ (weak field), the system then switches to control of the armature current as a function of the coil diameter, to maintain constant tension, the flux being held constant. At this point the line speed may have to be reduced, the operator accomplishing the adjustment manually. This invention may advantageously be employed to adjust the line speed automatically.

In order then to practice the invention, one must know $D$ at all times. Moreover, since there are occasions when the process line must be temporarily stopped, it is imperative that the diameter $D$ at the moment of stopping be "remembered." The circuitry of FIG. 2 will accomplish these objectives.

Referring now to FIG. 2, the reel speed signal (R.P.M.) obtained from the tachometer generator 20 is applied as a divisor — input to a divider 26. The line speed signal (which is a function of the line speed in feet per minute (FPM)) is fed as a dividend-input to the divider 26. The quotient output 28 from the divider 26 is applied to an operational amplifier, indicated generally at 30, through a resistor 32. Information concerning the start-up diameter of the coil 14 is applied to the amplifier 38 by means of a potentiometer 34 connected between a positive source of DC voltage (+24V) and ground, the slider being serially connected through normally open contacts 1CR1 and resistor 36 to the amplifier input.

The relays described in this application are identified as follows. The coils are numbered 1CR, 2CR, and 3CR. The contact pairs associated with the respective coils are identified for example as 3CR1, 3CR2, 3CR3, the 3 preceding the CR identifying the third contact relay, the numeral following CR identifying the particular contacts viz. first (1) second (2), third (3); the bar beneath the identifying numeration indicates that the contact is normally closed, while no bar signifies that the contacts are normally open.

The operational amplifier 30 includes a high gain amplifier 38 having a feedback path containing contacts 3CR1 and 1CR2, in parallel with an impedance 40. The output of the amplifier 38 is connected to a motor operated potentiometer indicated generally at 42, having potentiometers 46, 48 the slider contacts of which are arranged to be rotationally displaced in unison in accordance with the rotation of the motor 44. The slider of potentiometer 46 is connected to the input of the amplifier 38 through resistor 50. The slider of potentiometer 48 is connected through the contacts 3CR2 to the output 52. The slider of potentiometer 48 may be used to provide a signal for the operator to monitor when $Do$ is reached, or a separate potentiometer may be mounted on the common shaft of the motor operated potentiometer 42. Completing the description of the diameter memory and signal circuitry, the relay 1CR is energized through contacts 54 which are momentarily closed on signal from the logic circuitry 56.

The diameter signal D of FIG. 2 is applied as an input $D_1$ as shown in FIG. 3. Where a rewind reel is also to be monitored, a diameter memory and diameter signal circuit identical to FIG. 2, is used to provide the signal shown at $D_2$ in FIG. 3.

Referring now to FIG. 3, a line speed reference potentiometer is indicated at 58, the potentiometer being connected between a source of negative potential (−24vDC) and ground. (This potentiometer may be adjusted from the operator's console 22). The slider of the potentiometer 58 is connected to an operational amplifier indicated generally at 60, the amplifier 60 having resistors 62,64. A load resistor 66 is connected between the nodes identified as $A_1$ and $A_2$. The diameter signal $D_1$ is applied to a potentiometer 68, the slider of which is connected to the cathode of a diode 70 having its anode connected to node $A_2$. Similarly, the diameter signal $D_2$ is applied to potentiometer 72, the slider of which is connected to the cathode of a diode 74, having its anode connected to node $A_2$.

A non-inverting amplifier 76 having unit gain is inserted between node $A_2$ and an operational amplifier indicated generally at 78. The amplifier 78 has resistors identified at 80,82. The output of the operational amplifier 78 is applied to a line ramp generator 84 which develops a ramp signal for application to the line speed controller 86. The controller 86 is applied to the line speed pace motor 24 to control the speed thereof, and hence the line strip speed.

OPERATIONS

As stated earlier, the invention is applicable whenever the process line speed must be controlled because of the fact that the reel motor is operating at its highest rated speed. However, for illustrative purposes, operation will be described in a steel mill environment where a reel is to be payed out (For simplicity only the unwinding mode will be described although it should be understood that the invention is equally applicable to the winding or rewind mode). In the payout mode, diameter signal $D_1$ is developed while in the rewind mode $D_2$ is developed. Obviously, if both wind and rewind modes are to be monitored, $D_1$ and $D_2$ are simultaneously developed, and applied to the system of FIG. 3.

The line speed of the process is set by the operator by adjustment of the potentiometer 58. The required tension for the strip material is also adjusted by means not shown since it forms no part of this invention. The diameter size of the reel to be payed out is known to the operator and this information requires a certain definite setting for the potentiometer 34 (FIG. 2). In the steel mill, the reel 14 (FIG. 1) is first mounted on a mandrel 12 which is segmented and adapted to collapse so as to fit inside and adopted itself to various inner reel diameters. When the mandrel 12 is released it presses outward forcing itself tightly against the inner diameter of the reel. By means of sensors (not shown) the logic circuitry 56 (FIG. 2) then sends the signal momentarily closing contacts 54 thereby connecting power to relay 1CR. Upon the energization of relay 1CR: (a) contacts 1CR1 (FIG. 2) close, and the voltage corresponding to the operator setting for potentiometer 34 is applied as an input to operational amplifier 30, and (b) contacts 1CR2 open removing the short on the amplifier 30 to enable the actuation of the motor 44. The come-to-rest setting of the potentiometers 46,48 provides an analog voltage representative of the initial diameter of the reel 14.

At low speeds of the reel motor 18, the quotient output 28 of the divider 24 is unreliable. (Accordingly, the divider is not utilized until the reel motor 18 reaches sufficient speed to make the quotient output 28 reliable.) In the meanwhile the output signal D is that of the initial diameter. As the reel motor 18 increases in speed, a point is reached where the quotient output 28 of the divider 26 is reliable; this point is identifiable in that the armature A (FIG. 2) develops a voltage of a sufficient magnitude to energize relay 2CR. The contacts of 2CR1 close, applying power to relay 3CR. The energization of relay 3CR performs three functions: (a) 3CR1 opens removing the short on the operational amplifier 30 to cause the motor operated potentiometer 42 to be actuated; (b) contacts 3CR2 open isolating the diameter memory, and (c) contacts 3CR3 close so that the quotient signal 28 is fed directly to the output 52. Thus the setting of the slider of potentiometer 48 serves to "remember" the diameter $D$ should the process line be stopped for any reason. Also it should be observed that the quotient signal 28 is fed directly to the output 52 through now closed contacts 3CR3.

A brief consideration of the nature of the quotient signal 28 is in order, [(FPM ft./min.)/RPM(revolutions/min.)] = (number of feet/1 revolution).

1 revolution = the instantaneous circumference of the reel. Since the circumference = $\pi \times$ diameter of reel, the number of feet divided by $\pi$ equals the diameter of the coil. As the reel is payed out the diameter is constantly being reduced, while conversely during the wind up of mode the diameter is continuously increasing.

Motors are designed to operate between full field and weakest field to provide a range from base speed to the highest speed. Depending upon the manufacturer's specifications, operation beyond the weakest field may be permitted for certain voltages ranges and for limited periods of time.

With the weakest field setting, the motor is at maximum speed. Briefly, the line pace setter motor 24 sets the process line speed. The reel motor 18 is essentially a drag machine. At weak field, the motor 18 will run at higher speeds and voltage to accommodate the line speed and this could possibly cause electrical and mechanical damage to the motor.

The diameter signal $D_1$ ( and $D_2$ if it is used) is applied to system of FIG. 3. When the reel motor is at its highest speed the reel 14 has a finite diameter defined as $Do$. The setting of potentiometer 58 and the magnitude of resistors 62 and 64 establishes a voltage level at Node A1. The potentiometers 68 and 72 are adjusted ($K_2$ adjustment) so that the voltage matches the voltage at node A1 when the signals $D1$ (and $D2$) are at the control diameter $Do$. If equation 12 is solved so that: $1 = (FPMo/DoK_2)$, the diode 68 (or 72) will conduct when the ratio ($FPMo/DoK_2$) is $\geq 1$ and will be blocked when the ratio is $< 1$.

When the reel diameter $D>Do$, the diode 70 is blocked (Similarly if the rewind reel $D>Do$ diode 74 is blocked). The line space pacer motor is now running at the speed set by the operator by means of potentiometer 58. When either diameter signal $D \leq Do$, the associated diode 70 or 74 conducts so that the voltage at node $A_2$ decreases proportionally, causing the output of the operational amplifier 78 to decrease proportionally, and thus the line speed reference signal decreases proportionally, so that the line speed pace motor decreases proportionally as a function of the reel diameter.

Some idea of the magnitude of the time that is lost may be had from a consideration of the following calculations for a pay off coil. Assume the following conditions:
Line Data
Top Speed = 1,500 FPM
Pay off range 70 – 10 inches
Thickness of material 0.005 in.
$Do$ = 24 inches
Definitions
$\Delta$ = strip thickness (in feet)
$t$ = time in minutes
($RPMo/K1$) = $RPMo$ Assume a DC shunt motor having a field weakening range 3:1. We shall compute the time required to pay out the coil from 24 inches to 10 inches running at the top speed of 1,500 RPM, and then calculate the time required to perform the same task when the line speed is decreased as a function of diameter $D$. Starting at $Do$ =24 inches and RPM = 1,500 RPM at $D = Do$ $$(13) \ D(t) = Do - RPMc \ 2 \ \Delta t$$

at $t = t_1 \ D = D1$ $$(14) \ D(t_1) = D_1 = Do - RPMt_2 \ 2\Delta t_1$$

solve for $t_1$ $$(=) \ t_1 = (Do - D_1/2\Delta RPMc)$$

But from equation (3) and definition for RPMc.

$$(16) \ FPMo = Do \ \pi \ RPMc$$

$$(17) \ RPMc = (FPMo/Do \ \pi)$$

Substituting equation (17) in equation (15):

$$(18) \ t_1 = [(Do - D_1) \ Do \ \pi / 2\pi \ FPMo]$$

Let $Lo$ = the total length unwound from $Do$ 24 inches to $D_1$ = 10 inches $$(19) \ Lo = \pi \ [(Do^2/4\Delta) - (D_1^2/4\Delta)]$$

$$(20) \ Lo = (\pi/4\Delta) \ (Do^2 - D_1^2)$$

If this length $Lo$ were run at $FPMo$, neglecting deceleration, the time to would be $$(21) \ to = (Lo/FPMo)$$

$$(22) \ to = (\pi/4\Delta) \ (Do^2 - D_1^2)/FPMo$$

The extra time required is $\Delta^1 t = t_1 - to$

(23) $(\Delta't) = [(Do - D_1) Do\pi/2\Delta \text{ FPM}o] - [\pi(Do^2 - D_1^2)/4\Delta\text{FPM}o]$

(24) $(\Delta't) = [2(Do-D_1) Do\pi/4\Delta \text{ FPM}o] - ]\pi(Do^2 - D_1^2)/4\pi \text{ FPM}o]$

(25) $\pi(2Do^2 - DoD_1) - (Do^2 - D_1^2)/4 \Delta \text{ FPM}o$

(26) $\pi (Do^2 - 2DoD_1 + D_1^2)/4\Delta \text{ FPM}o$

(27) $\pi (Do - D_1)^2/4\Delta \text{ FPM}o$

In the example given
$\Delta = 0.005$ in $= 4.16 \times 10^{-4}$ feet
$Do = 24$ inches $= 2$ feet
$D_1 = 10$ inches $= 0.835$ feet
$\text{FPM}o = 1,500$ ft/min
Substituting in equation (27)
$(\Delta't) = [\pi(2 - 0.835)^2/4 \times 4.16 \times 10^{-4} \times 1.5 \times 10^3]$
$= 1.7$ minutes

I claim:

1. A speed regulation system for a line speed pace motor for actuating strip material being wound or unwound in coil form by a reel motor comprising:
   means for providing successive diameter signals which are a function of the instantaneous coil diameter $D$, the coil having a finite diameter $Do$ when said reel motor is at the weakest field flux, said diameter signal means comprising divider means having dividend and divisor inputs and a quotient output, said inputs being connected to receive a line speed signal and a reel motor rotational speed signal respectively, the quotient output being a function of the instantaneous diameter $D$;
   means coupled to said diameter signal means, to receive said diameter signals and deliver control signals as a function of the instantaneous diameter when $D \leq Do$; and
   means for regulating the speed of said line speed pace motor connected to receive dual inputs, the one being a reference speed input signal, the other being said control signals, and for delivering a constant speed signal to said line speed pace motor when $D>Do$, and progressively decreasing speed signals to said line speed pace motor for all magnitude of $D \leq Do$.

2. A speed regulation system for a line speed pace motor for actuating strip material being wound or unwound in coil form by a reel motor comprising:
   means for providing successive diameter signals which are a function of the instantaneous coil diameter $D$, the coil having a finite diameter $Do$ when said reel motor is at the weakest field flux;
   means coupled to said diameter signal means, to receive said diameter signals and deliver control signals when $D \leq Do$, said control signal means comprising a potentiometer and a diode, said diameter signals being applied across said potentiometer,
   means for regulating the speed of said line speed pace motor connected to receive dual inputs, said potentiometer having a slider connected to one electrode of said diode, the other electrode being connected to one of said dual inputs to said regulating speed means, the slider being adjusted so that the diode is forward biased when $D \leq Do$, the other dual input being a reference speed input signal, said regulating speed means delivering a constant speed signal to said line speed pace motor when $D>Do$, and progressively decreasing speed signals to said line speed pace motor for all magnitudes of $D \leq Do$.

3. A speed regulation system for a line speed pace motor for actuating strip material being wound or unwound in coil form by a reel motor comprising:
   means for providing successive diameter signals which are a function of the instantaneous coil diameter $D$, the coil having a finite diameter $Do$ when said reel motor is at the weakest field flux;
   means coupled to said diameter signal means, to receive said diameter signals and deliver control signals as a function of the instantaneous diameter when $D \leq Do$, and
   means for regulating the speed of said line speed pace motor comprising an operational amplifier having one terminal to receive a reference input signal and a second terminal connected to said control signal means, said regulating speed means delivering a constant speed signal to said line speed pace motor when $D>Do$, and progressively decreasing speed signals to said line speed pace for all magnitudes of $D \leq Do$.

4. A speed regulation system for a line speed pace motor for actuating strip material being wound or unwound in coil form by a reel motor comprising
   a. means for providing successive diameter signals $D$, the coil having a finite diameter $Do$ when said reel motor is at the weakest field flux, said diameter signal means comprising divider means having dividend and divisor inputs and a quotient output, said inputs being connected to receive a line speed signal and a reel motor rotational speed signal respectively, the quotient output being a function of the instantaneous diameter $D$;
   b. means coupled to said diameter signal means, to receive said diameter signals and deliver control signals as a function of the instantaneous diameter when $D \leq Do$, said control signal means comprising a potentiometer and a diode, said diameter signal being applied across said potentiometer, said potentiometer having a slider connected to one electrode of said diode, the slider being adjusted so that the diode is forward biased when $D \leq Do$; and
   c. means for regulating the speed of said line speed pace motor connected to receive dual inputs, the one being a reference command speed input signal, the other being connected to the other electrode of said diode to receive said control signals, said speed regulating means delivering a constant speed signal to said line speed pace motor when $D>Do$, and a progressively decreasing speed signal to said line speed pace motor for all magnitude of $D \leq Do$.

* * * * *